(12) United States Patent
Liu (10) Patent No.: US 8,995,334 B2
(45) Date of Patent: Mar. 31, 2015

(54) METHOD AND SYSTEM FOR SELECTING ACCESS GATEWAY AND GATEWAY SELECTION EXECUTION NODE IN MOBILE PACKET DOMAIN

(75) Inventor: Hong Liu, Xicheng District (CN)

(73) Assignee: China Mobile Communications Corporation, Beijing (CN)

( * ) Notice: Subject to any disclaimer, the term of this patent is extended or adjusted under 35 U.S.C. 154(b) by 732 days.

(21) Appl. No.: 12/681,321

(22) PCT Filed: Oct. 20, 2008

(86) PCT No.: PCT/CN2008/072753
§ 371 (c)(1),
(2), (4) Date: Aug. 18, 2010

(87) PCT Pub. No.: WO2009/065335
PCT Pub. Date: May 28, 2009

(65) Prior Publication Data
US 2010/0303009 A1    Dec. 2, 2010

(30) Foreign Application Priority Data
Oct. 23, 2007  (CN) .......................... 2007 1 0176228

(51) Int. Cl.
*H04W 4/00*   (2009.01)
*H04W 48/00*  (2009.01)
*H04L 29/12*  (2006.01)

(52) U.S. Cl.
CPC ......... *H04W 48/17* (2013.01); *H04L 29/12066* (2013.01); *H04L 29/12188* (2013.01); *H04L 61/1511* (2013.01); *H04L 61/1588* (2013.01)
USPC .......................................... 370/328; 370/349

(58) Field of Classification Search
CPC ................... H04L 29/12066; H04L 29/12188; H04L 61/1511; H04L 61/1588; H04W 48/17
See application file for complete search history.

(56) References Cited

U.S. PATENT DOCUMENTS

| | | | | |
|---|---|---|---|---|
| 5,854,901 | A * | 12/1998 | Cole et al. | 709/245 |
| 7,251,826 | B1 * | 7/2007 | Gardos et al. | 726/6 |
| 8,082,365 | B1 * | 12/2011 | Xie et al. | 709/245 |
| 8,213,387 | B2 * | 7/2012 | Xia et al. | 370/331 |
| 2003/0002480 | A1 * | 1/2003 | Giustina et al. | 370/352 |
| 2004/0057442 | A1 * | 3/2004 | Westman et al. | 370/401 |
| 2004/0122976 | A1 * | 6/2004 | Dutta et al. | 709/245 |
| 2006/0258356 | A1 * | 11/2006 | Maxwell et al. | 455/436 |
| 2007/0113290 | A1 * | 5/2007 | Charles et al. | 726/27 |
| 2007/0180090 | A1 * | 8/2007 | Fleischman et al. | 709/223 |
| 2008/0189437 | A1 * | 8/2008 | Halley | 709/245 |
| 2008/0273680 | A1 * | 11/2008 | Zohar et al. | 379/201.01 |
| 2009/0055929 | A1 * | 2/2009 | Lee et al. | 726/23 |

* cited by examiner

*Primary Examiner* — Marsha D Banks Harold
*Assistant Examiner* — Hooman Houshmand
(74) *Attorney, Agent, or Firm* — Workman Nydegger (57) ABSTRACT

A method and system for selecting a gateway and a gateway selection execution node in the mobile packet domain are disclosed. The method includes: encapsulating, by a gateway selection execution node upon reception of a bearer setup request transmitted from a User Equipment, an operator domain name corresponding to the bearer setup request into a DNS parse request when creating the DNS parse request, and transmitting the DNS parse request to a DNS server; parsing by the DNS server for obtaining the address of an access gateway; returning by the DNS server, to the gateway selection execution node, a DNS parse result containing the address information of the access gateway corresponding to the operator domain name; selecting by the gateway selection execution node according to the address information the access gateway corresponding to the operator domain name as the access gateway corresponding to the bearer setup request.

12 Claims, 8 Drawing Sheets

Fig. 13

METHOD AND SYSTEM FOR SELECTING ACCESS GATEWAY AND GATEWAY SELECTION EXECUTION NODE IN MOBILE PACKET DOMAIN

This application is a National Stage Application of PCT/CN2008/072753, filed 20 Oct. 2008, which claims benefit of Ser. No. 200710176228.6, filed 23 Oct. 2007 in China and which applications are incorporated herein by reference. To the extent appropriate, a claim of priority is made to each of the above disclosed applications.

FIELD OF THE INVENTION

The present invention relates to a method and system for selecting an access gateway and a gateway selection execution node, and in particular to a method and system for selecting an access gateway and a gateway selection execution node in a mobile packet domain.

BACKGROUND OF THE INVENTION

Figure 1:
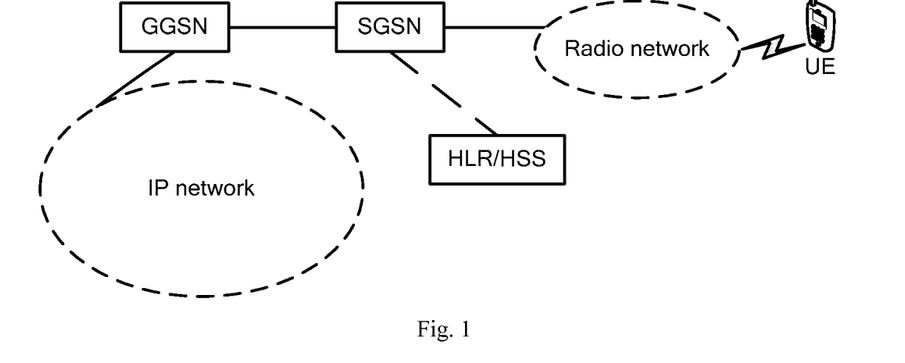
FIG. 1 is a schematic diagram of the structure of a network in the mobile packet domain in the prior art.

An existing network in the mobile packet domain has a structure as illustrated in FIG. 1. As shown, a Gateway GPRS Supporting Node (GGSN), which is a gateway between a mobile communication network and an IP network, is responsible for assigning an IP address to a User Equipment (UE) to enable the UE to access the IP network; a Serving GPRS Supporting Node (SGSN) responsible for resource management and control is used to select an appropriate GGSN for the UE and provide a channel for communication between the UE and the GGSN; and a Home Location Register/Home Subscription Storage (HLR/HSS) is responsible for storing user subscription data.

Figure 2:
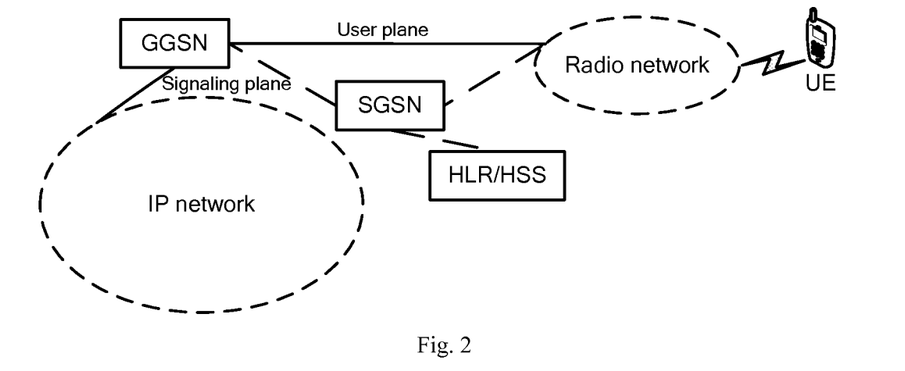
FIG. 2 is a schematic diagram of the structure of a network in the mobile packet domain defined in the 3GPP R7 in the prior art.

As illustrated in FIG. 2, starting from the 3GPP R7, it is allowed to directly transfer user plane data between a radio network and a GGSN, but a connection in the signaling plane with the radio network is established through an SGSN, which is referred to as the One Tunnel architecture.

Figure 3:
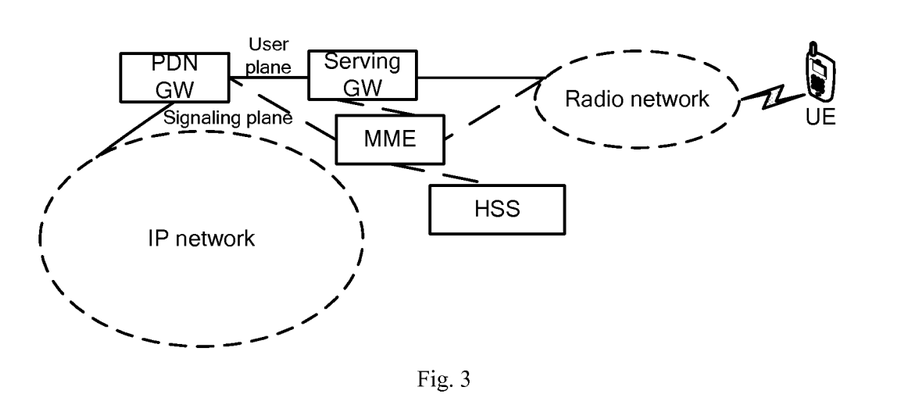
FIG. 3 is a schematic diagram of the structure of a possible future network in the mobile packet domain recited in the prior art.
Figure 4:
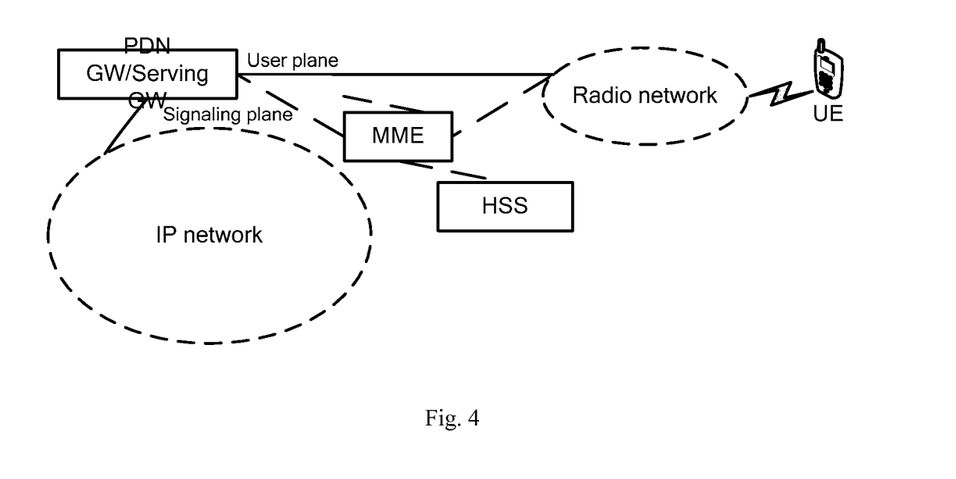
FIG. 4 is another schematic diagram of the structure of a possible future network in the mobile packet domain recited in the prior art.

The 3GPP is under ongoing standardization efforts to simplify the structure of the network in the mobile packet domain, and FIGS. 3 and 4 are two promising future structures of the network in the mobile packet domain. As shown in FIGS. 3 and 4, a Packet Data Network Gateway (PDN GW) and a Serving Gateway (Serving GW) evolve from the GGSN, the PDN GW is responsible for assigning an IP address to a UE, and the Serving GW facilitates enabling the UE to move in a large range while maintaining the PDN GW unchanged; and a Mobility Management Entity (MME), which evolves from the SGSN, is responsible for resource management and control and selects an appropriate PDN GW for the UE.

Figure 5:
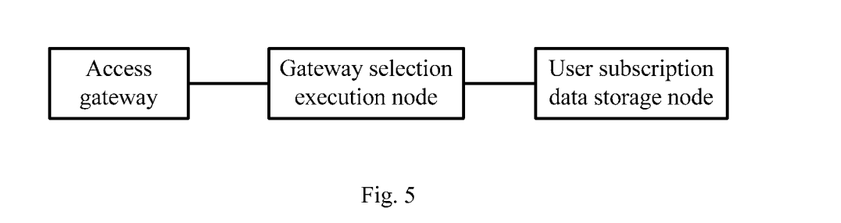
FIG. 5 is a schematic diagram of abstract relationships between network element nodes in the mobile packet domain in the prior art.

As can be apparent from the foregoing descriptions, three logic nodes, i.e., a gateway node, a gateway selection execution node and a user subscription data storage node, with their relationships as illustrated in FIG. 5, exist in any of the existing network architecture in the mobile packet domain, the network architecture in the mobile packet domain defined in the 3GPP R7 and possible future network architectures in the mobile packet domain.

Figure 6:
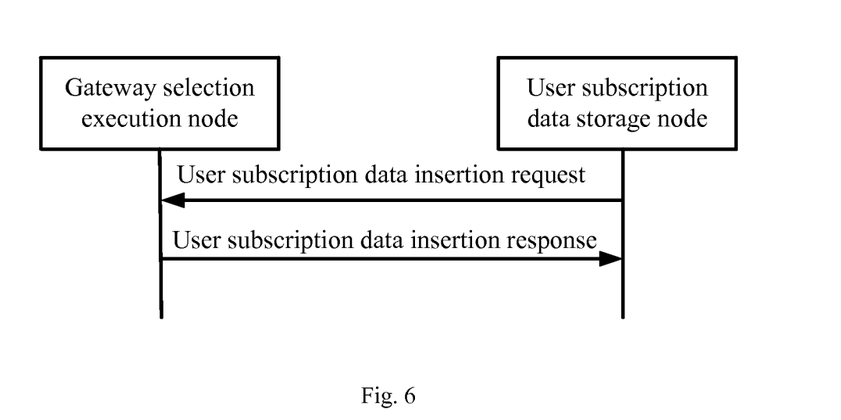
FIG. 6 is a flow chart of issuing user subscription data in the prior art.

For any of the existing network architecture in the mobile packet domain, the network architecture in the mobile packet domain defined in the 3GPP R7 and the possible future network architectures in the mobile packet domain, the user subscription data is issued to the gateway selection execution node through the user subscription data storage node when the user is attached to the network, the user subscription data is also issued to a new gateway selection execution node through the user subscription data storage node if the original gateway selection execution node is replaced by the new gateway selection execution node while the user is moving, and in the case of a change in the user subscription data, the changed user subscription data is also issued to the new gateway selection execution node through the user subscription data storage node. A flow of the issuing is as illustrated in FIG. 6.

Figure 7:
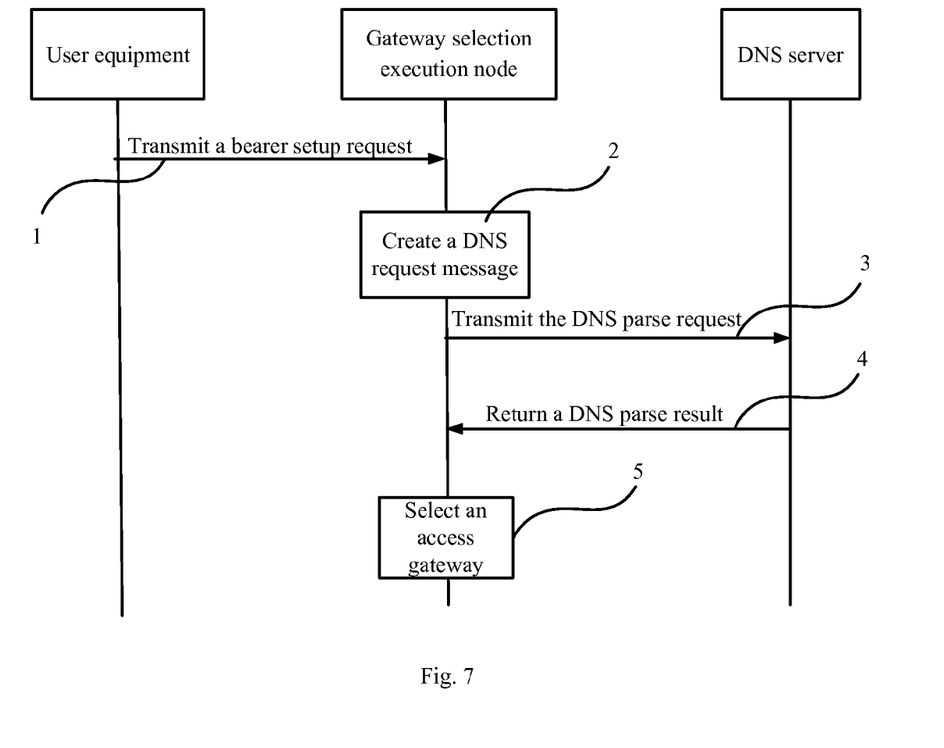
FIG. 7 is a flow chart of selecting an access gateway node in the mobile packet domain.

For any of the existing network architecture in the mobile packet domain, the network architecture in the mobile packet domain defined in the 3GPP R7 and the possible future network architectures in the mobile packet domain, selection of a gateway in the packet domain is performed by a gateway selection execution node in a flow as illustrated in FIG. 7, which generally includes:

Operation 1: A User Equipment transmits a bearer setup request to the gateway selection execution node;
Operation 2: The gateway selection execution node creates a Domain Name Server (DNS) request message;
Operation 3: The gateway selection execution node transmits the DNS parse request to a DNS server;
Operation 4: The DNS server returns to the gateway selection execution node a DNS parse result after parsing;
Operation 5: The gateway selection execution node selects from the DNS parse result a gateway node as an access gateway for the bearer setup request.

In the operation 2, typically the gateway selection execution node determines an Access Point Name (APN) for DNS parsing by appending a country code and a network code of the user contained in an IMSI field of the user subscription data to an APN indicated by the user. Thus, even if an APN indicated by a roaming user is the same as that indicated by a local user, an appropriate gateway node for the roaming user can also be addressed according to the country code and the network code (an operator generally expects that traffic of its own user roaming to another operator can be forwarded to its own network node for processing).

In the operation 3, the DNS server of an operator has to be configured with all combinations of roam APNs of another operator, as well as country codes and network codes possessed by the another operator, to support a roaming user from the another operator.

In the operation 1, if the APN indicated by the user is not presented explicitly in the bearer setup request message transmitted from the User Equipment, it is essentially indicated that the user expects to use a default APN, and thus in the operation 2 the gateway selection execution node uses the default APN configured in the user subscription data as the APN indicated by the user when creating the APNX for DNS parsing.

Prior to the operation 2, the gateway selection execution node may select a gateway node according to a certain field contained in the user subscription data and that contained in the bearer setup request message transmitted from the user, and in this case the operations 2, 3, 4 and 5 may be not necessary. For example, if the bearer setup request message transmitted from the user contains the IP address of a gateway node of which the user expects the use, and the use of the gateway node by the user is also allowed according to the user subscription data, then the gateway selection execution node may select the gateway node to serve the user.

In the operation 2, the gateway selection execution node may append other information according to the configuration of an operator, e.g., part of contents other than the country code and the network code in the International Mobile Subscriber Identity (IMSI), when creating the APNX for DNS parsing.

Following the operation 5, if no gateway node can be selected in the operation 5 due to the lack of the IP address of a gateway node or a list of IP addresses of gateway nodes in the DNS parse result, or if the IP address of the gateway node selected in the operation 5 is unreachable, then the gateway selection execution node can reject the bearer setup request of the user, select a gateway node (e.g., a default gateway node) according to the configuration of the operator or select a gateway node according to the information in the user subscription data (e.g., a default gateway node configured in the user subscription information), or recreate an APNX for DNS parsing and repeat the operations 3, 4 and 5 to parse the address of the gateway node.

As can be apparent from an analysis of the foregoing prior art, there are the following drawbacks in the prior art:

1) In the prior art, to enable the roaming user equipment to access its home operator's gateway node, the DNS server of the roam operator (i.e. the operator to which the user roams) has to be configured with an Access Point Name (APN), a country code, a network code and a corresponding gateway address of the home operator, so that the gateway selection execution node of the roam operator can retrieve the address of the gateway node of the home operator in the DNS parsing process, and if the DNS server of the roam operator has not been configured with any address information of an access gateway node of the home operator, or the same Access Point Name (APN) as the home access gateway exists in the roam DNS server without storing any country code and network code of the home operator, then it is impossible to select any gateway of the home operator for the User Equipment.

2) The gateway selection solution in the prior art is demanding for the configuration of DNS servers of respective operators in that an APN, a country code, a network code and a corresponding gateway address corresponding to an operator has to be configured in DNS servers of other operators. When the gateway address of an operator is changed or a new network code is added for the operator, the DNS servers of other operators have to be modified, thus making data update inconvenient.

3) For a DNS server of an operator, at least contents such as an APN, a country code, a network code and a corresponding gateway address corresponding to the operator have to be stored, and since the country code and the network code do not correspond uniquely to an operator, that is, the operator may be provided with plural network codes, the DNS server of the operator has to store contents separately under various country codes and different network codes, resulting in a significant waste in the storage cost of the DNS server of the operator.

4) The existing gateway selection solution is inflexible in the DNS parsing process due to the limitation of information stored at the DNS server of the roam operator, thus making it inconvenient for the home operator to deploy a roam service.

SUMMARY OF THE INVENTION

An object of the invention is to provide a method and system for selecting a gateway and a gateway selection execution node in the mobile packet domain, so that limitations of a roam DNS parse server upon selection of a gateway and limitations upon gateway address parsing according to a country code and a network code are alleviated while selecting a gateway at a roam place.

To achieve the foregoing object, the invention provides a method for selecting an access gateway in the mobile packet domain, which includes:

encapsulating, by a gateway selection execution node upon reception of a bearer setup request transmitted from a user equipment, an operator domain name corresponding to the bearer setup request into a DNS parse request when creating the DNS parse request, and transmitting the DNS parse request to a DNS server;

parsing, by the DNS server, for obtaining the address of an access gateway;

returning, by the DNS server, to the gateway selection execution node a DNS parse result containing address information of the access gateway corresponding to the operator domain name; and selecting, by the gateway selection execution node, the access gateway corresponding to the operator domain name as an access gateway corresponding to the bearer setup request according to the address information.

The invention further provides a system for selecting an access gateway in the mobile packet domain, which includes a gateway selection execution node and a first DNS server configured to parse a parse request transmitted from the gateway selection execution node. The gateway selection execution node further includes a first module configured to encapsulate an operator domain name corresponding to a bearer setup request into the DNS parse request when creating the DNS parse request.

The invention further provides a gateway selection execution node including a first module configured to encapsulate an operator domain name corresponding to a bearer setup request into a DNS parse request when creating the DNS parse request.

As can be apparent from the foregoing technical solutions, the invention introduces an operator domain name parsing mechanism for selecting the access gateway of the operator corresponding to the user equipment, which has the following advantageous effects:

1) The limitation of a roam DNS parse server upon selection of a gateway is alleviated, and even the roam DNS server without storing address information of any access gateway of the home operator can also select the home access gateway for the roaming user equipment;

2) When a gateway address or other relevant information of an operator has been changed or a new network code is added for the operator, no data in DNS servers of other operators has to be adapted;

3) The cost of data storage at the DNS server of the roam operator is lowered.

The technical solutions of the invention will be further detailed hereinafter with reference to the drawings and embodiments.

DETAILED DESCRIPTION OF THE EMBODIMENTS

Figure 8:
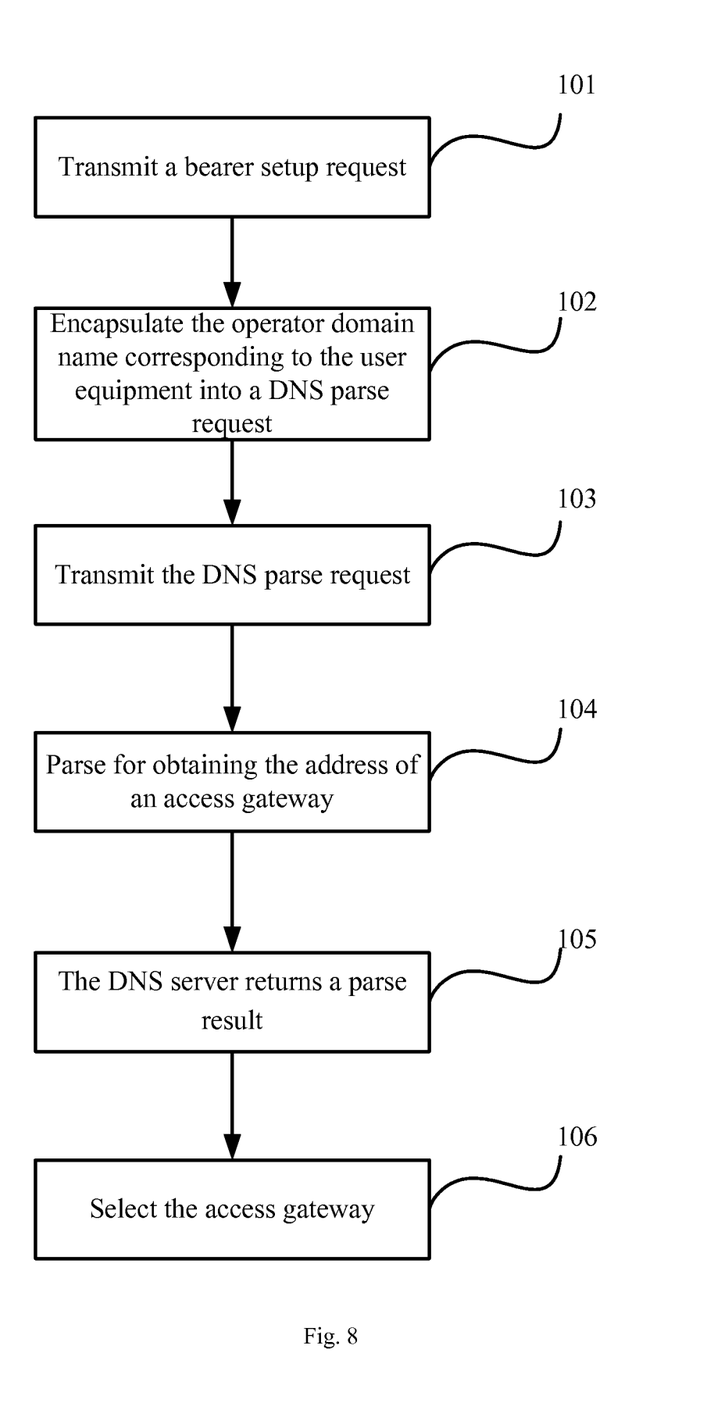
FIG. 8 is a flow chart of a method for selecting a gateway in the mobile packet domain according to a first embodiment of the invention.

A First Embodiment of the Method for Selecting a Gateway in the Mobile Packet Domain according to the Invention As shown in FIG. 8 illustrating a flow chart of a method for selecting a gateway in the mobile packet domain according to a first embodiment of the invention, an operator domain name parsing mechanism is introduced to the invention for selecting an access network of an operator corresponding to a User Equipment, and a specific flow is as follows:

Operation 101: The User Equipment transmits a bearer setup request to a gateway selection execution node;

Operation 102: The gateway selection execution node encapsulates an operator domain name corresponding to the User Equipment into a DNS parse request when creating the DNS parse request. In particular, the gateway selection execution node creates the operator main name corresponding to the bearer setup request from a home operator domain name feature and an access point name. Here, before APN parsing is performed at a DNS server, a field for storing the operator domain name feature corresponding to the user equipment as an operator specific postfix required to be appended for APN parsing is added in the user data stored at a user subscription data storage node, and the specific postfix is appended to an APN carried in the bearer setup request transmitted from the user equipment in order to form an APN for DNS parsing;

Operation 103: The gateway selection execution node transmits the DNS parse request containing the operator domain name to the DNS server.

Operation 104: The DNS server parses for obtaining the address of an access gateway;

Operation 105: The DNS server returns to the gateway selection execution node a parse result containing the address information of the access gateway corresponding to the operator domain name;

Operation 106: According to the address information, the gateway selection execution node selects the access gateway corresponding to the operator domain name as an access gateway corresponding to the bearer setup request.

In the present embodiment, the gateway selection execution node may retrieve the operator domain name feature corresponding to the user equipment from the user subscription data storage node. The user subscription data of the home operator domain name feature corresponding to the user equipment is stored at the user subscription data storage node, and the home operator domain name feature is issued to the gateway selection execution node by transmitting the user subscription data thereto.

Specifically, a field may be added in the user data stored at the user subscription data storage node to store the operator domain name feature corresponding to the user equipment as an operator specific postfix required to be appended for APN parsing, and the specific postfix is required to be appended before the APN parsing is performed by the gateway selection execution node via the DNS server. The specific postfix may be a string of characters with a variable length (the maximum length of the string of characters may possibly be specified for standardization to avoid a relevant message with an incontrollable size). An operator may use a string of characters (the domain name owned by the operator) as the value of the field, and thus in the DNS parsing process, the DNS parse request may be forwarded to the DNS server owned by the operator to thereby retrieve the address of an access gateway node of the operator. A wider range of extended applications are possible for an operator, for example, it is possible for the operator to configure plural operator domain names corresponding to respective access gateways, and due to the introduction of the operator domain name parsing mechanism into the process of selecting an access gateway by the gateway selection execution node, an access gateway node may be flexibly selected by configuring an operator domain name flexibly, so as to eliminate a limitation of the roam DNS server upon selection of an access gateway and consequently enable the operator to deploy a roam service more flexibly.

In the present embodiment, the gateway selection execution node determines whether the bearer setup request contains an access point name indicated by the user equipment before creating the DNS parse request, and if the bearer setup request transmitted from the user equipment contains an access point name indicated by the user equipment, then the gateway selection execution node uses it as the access point name to create the operator domain name; and if the bearer setup request transmitted from the user equipment contains no access point name indicated by the user equipment, then the gateway selection execution node uses a default access point name configured in the user subscription data as the access point name to create the operator domain name.

In the present embodiment, the information used by the gateway selection execution node to create the operator domain name corresponding to the bearer setup request when creating the DNS parse request may further include a country code and/or a network code in an International Mobile Subscriber Identity or information other than the country code and the network code to create the operator domain name corresponding to the bearer setup request.

Figure 9:
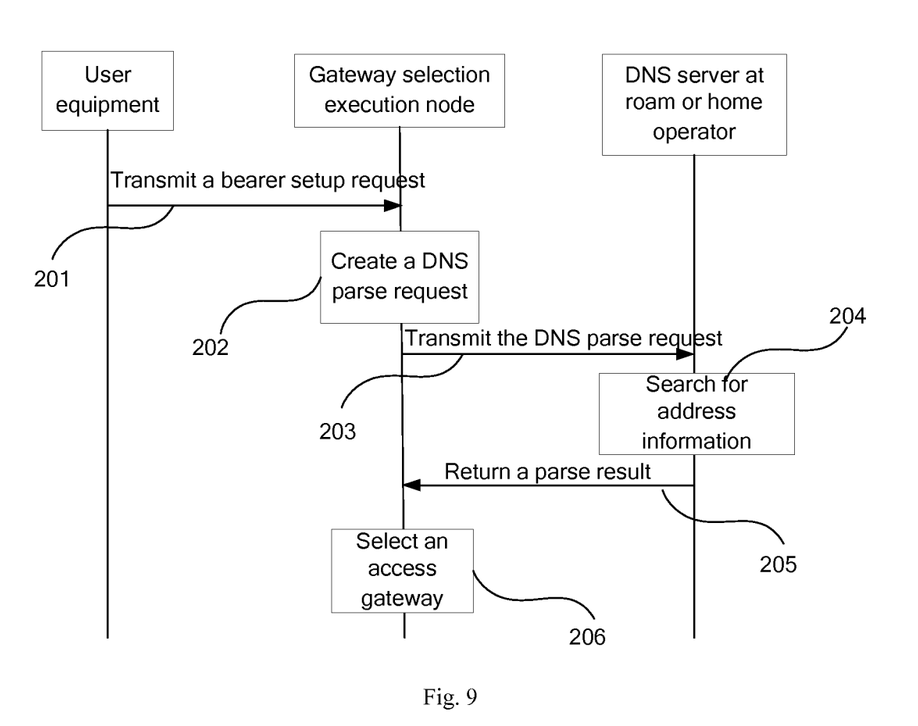
FIG. 9 is a flow chart of a method for selecting a gateway in the mobile packet domain according to a second embodiment of the invention.

A Second Embodiment of the Method for Selecting a Gateway in the Mobile Packet Domain according to the Invention In the present embodiment, a gateway selection execution node is a roam or home gateway selection execution node for a user equipment, and a DNS server is one owned by a roam or home operator in which the operator domain name corresponding to the user equipment (i.e., the domain name of the home operator) and the address of an access gateway corresponding to the operator domain name are stored. A flow of the present embodiment as illustrated in FIG. 9 includes:

Operation 201: The user equipment transmits a bearer setup request to the gateway selection execution node;

Operation 202: The gateway selection execution node encapsulates a domain name of the home operator corresponding to the user equipment into a DNS parse request when creating the DNS parse request;

Operation 203: The gateway selection execution node transmits the DNS parse request containing the operator domain name to the DNS server of the roam operator;

Operation 204: The DNS server of the roam or home operator is queried and searches for the address of an access gateway corresponding to the operator domain name based on the operator domain name;

Operation 205: The DNS server of the roam or home operator returns to the gateway selection execution node a parse result containing the address information of the access gateway corresponding to the domain name of the home operator;

Operation 206: According to the address information, the gateway selection execution node selects the access gateway corresponding to the operator domain name as an access gateway corresponding to the bearer setup request.

Figure 10:
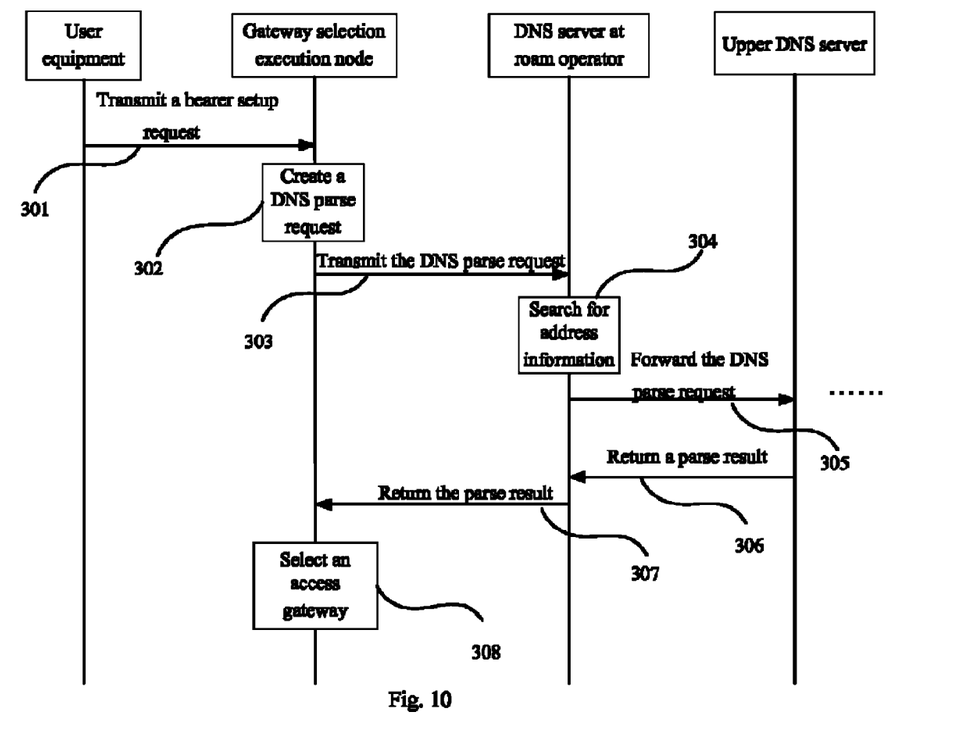
FIG. 10 is a flow chart of a method for selecting a gateway in the mobile packet domain according to a third embodiment of the invention.

A Third Embodiment of the Method for Selecting a Gateway in the Mobile Packet Domain according to the Invention In the present embodiment, a user equipment is in a roam status, a gateway selection execution node is a roam gateway selection execution node for the user equipment, and a DNS server is one owned by a roam operator without storing therein any domain name of a home operator or any address of an access gateway corresponding to the operator domain name. A flow of the present embodiment as illustrated in FIG. 10 includes:

Operation 301: The user equipment transmits a bearer setup request to the gateway selection execution node;

Operation 302: The gateway selection execution node encapsulates a domain name of the home operator corresponding to the user equipment into a DNS parse request when creating the DNS parse request;

Operation 303: The gateway selection execution node transmits the DNS parse request containing the operator domain name to the DNS server of the roam operator;

Operation 304: The DNS server of the roam operator is queried, but no address information of the access gateway corresponding to the domain name of the home operator (i.e., a DNS entry corresponding to an APN indicated by the user equipment in the bearer request) is retrieved;

Operation 305: The DNS server of the roam operator forwards the parse request to an upper DNS server for recursive DNS parsing in a standard recursive DNS query manner until the address information of the access gateway corresponding to the domain name of the home operator is retrieved.

In the present operation, as long as the domain name is legitimate, the use of standard domain name parsing can definitely complete parsing and retrieve the address of the access gateway node corresponding to the domain name of the home operator (the parse request can finally be forwarded to a DNS server of the home operator and then the address of the access gateway can be retrieved regardless of whether other DNS servers can complete parsing); further, the domain name of the operator is globally unique, and the operator can be configured with plural domain names corresponding to respective access gateways to thereby avoid a drawback of determining an access gateway node by a country code and a network code.

If no DNS entry corresponding to the APN indicated by the user equipment in the service setup request is found in a DNS server of the roam operator (typically because the user is a roaming user), then recursive DNS parsing is performed in the standard recursive DNS query manner, and a correct parse result can be transmitted to the gateway selection execution node as long as there is a corresponding DNS entry in a DNS server of the home operator of the user, so that the gateway selection execution node can retrieve the IP address of the access gateway.

Operation 306: The upper DNS server of the DNS server of the roam operator returns the DNS parse result;

Operation 307: The DNS server of the roam operator receives the DNS parse result returned from the upper DNS server and then returns to the gateway selection execution node the parse result containing the address information of the access gateway corresponding to the domain name of the home operator of the user equipment;

Operation 308: According to the address information, the gateway selection execution node selects the access gateway corresponding to the operator domain name as an access gateway corresponding to the bearer setup request.

Further, it shall be noted that the technical solutions in the foregoing embodiments of the invention does not conflict with the gateway selection solutions in the prior art but can be used in combination with the existing gateway selection solutions.

In the foregoing embodiments, if the APN indicated by the user is not presented explicitly in the bearer setup request message transmitted from the user equipment, then it is essentially indicated that the user expects to use a default APN, and thus the gateway selection execution node uses the default APN configured in the user subscription data as the APN indicated by the user when creating the APN for DNS parsing.

The gateway selection execution node still can select an access gateway according to some fields contained in the user subscription data and those contained in the bearer setup request message transmitted from the user, and in this case the subsequent operation of inserting the operator domain name and the subsequent parsing process may be omitted, and the existing flow of selecting a gateway may be followed. For example, if the bearer setup request message transmitted from the user equipment contains the IP address of an access gateway which the user expects to use, and the user subscription data also allows the access gateway to be used for the user, then the gateway selection execution node may select to use the access gateway to serve the user.

The gateway selection execution node may append other information according to the configuration of an operator, e.g., part of contents other than the country code and the network code in the IMSI, etc., when creating the APN for DNS parsing.

If no access gateway can be selected because the DNS parse result does not provide any IP address of a gateway node or a list of IP addresses of gateway nodes, or, if the IP address of the selected gateway node is unreachable, then the gateway selection execution node can reject the bearer setup request of the user, select an access gateway (e.g., a default access gateway) according to the configuration of the roam operator, select an access gateway according to the information in the user subscription data (e.g., a default access gateway configured in the user subscription information) or recreate an APN for DNS parsing and perform DNS parsing to retrieve address information of an access gateway. When recreating an APN for DNS parsing, the gateway selection execution node may also append the country code and/or the network code of the user contained in the IMSI field in the user subscription data to the APN indicated by the user to thereby determine the APN for DNS parsing in the creation manner in the prior art, or encapsulate the operator domain name into the DNS parse request for parsing at the DNS server according to the method of the embodiments of the invention.

Moreover, the operator may modify the value of the field of "the operator specific postfix required to be appended for APN parsing" to thereby invalidate automatically DNS entries configured at DNS servers of other operators; or serve a specific user through another gateway node at the next time of setting up a bearer for the user; or reject serving the user by adding an invalid operator domain name as the postfix.

Figure 11:
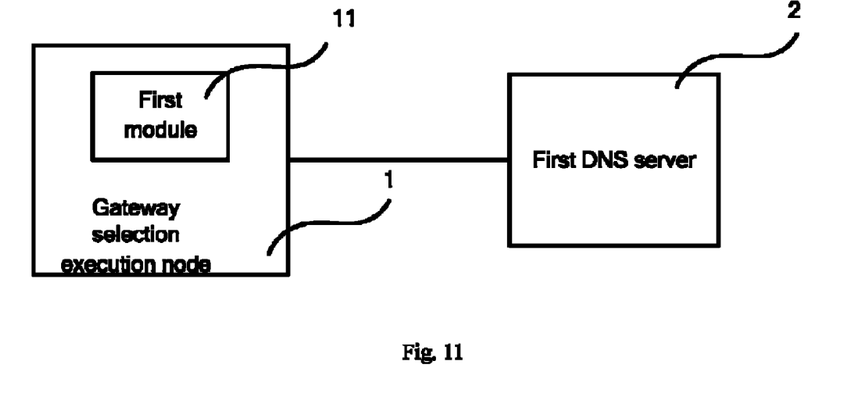
FIG. 11 is a structural schematic diagram of a system for selecting a gateway in the mobile packet domain according to a first embodiment of the invention.

A First Embodiment of the System for Selecting a Gateway in the Mobile Packet Domain according to the Invention As illustrated in FIG. 11, the system for selecting a gateway in the mobile packet domain according to the present embodiment includes a gateway selection execution node 1 and a first DNS server 2 configured to parse a parse request transmitted from the gateway selection execution node, and the gateway selection execution node 1 further includes a first module 11 configured to encapsulate an operator domain name corresponding to a bearer setup request into the DNS parse request when creating the DNS parse request.

Two scenarios may exist with the system for selecting a gateway according to the present embodiment:

1) The first DNS server acts as a DNS server of a roam or home operator, and if the operator domain name and address information of an access gateway corresponding to the operator domain name are stored in the first DNS server, then the first DNS server is queried and searches based on the operator domain name when performing DNS parsing, and the address information of the access gateway corresponding to the operator domain name is retrieved and then returned to the gateway execution node.

Figure 12:
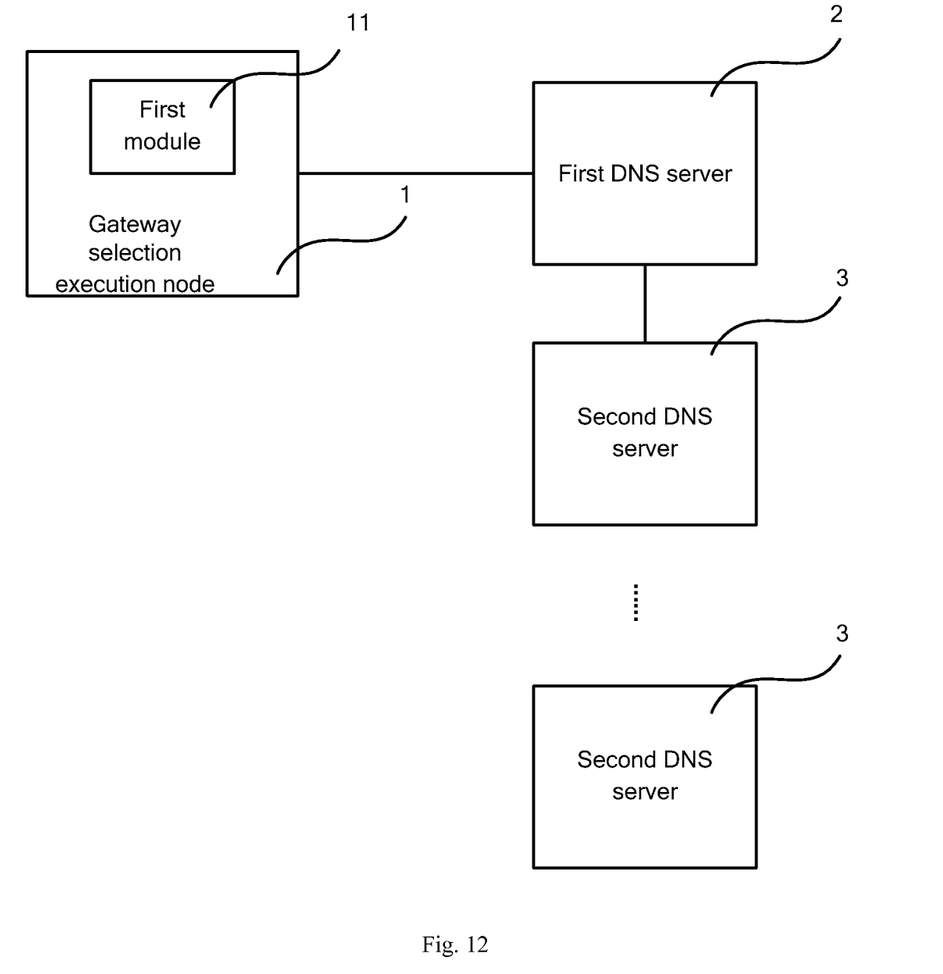
FIG. 12 is another structural schematic diagram of the system for selecting a gateway in the mobile packet domain according to the first embodiment of the invention.

2) As illustrated in FIG. 12, the first DNS server acts as a DNS server of a roam operator, and if the first DNS server does not store the operator domain name and the address information of the access gateway corresponding to the operator domain name, then the DNS parse request is transmitted to a second DNS server 3 when performing DNS parsing, and the address information of the access gateway corresponding to the operation domain name is retrieved in a standard manner of domain name parsing, here, the second DNS server is an upper DNS server of the first DNS server, and there may be one or more second DNS servers involved in a standard recursive DNS query manner.

Figure 13:
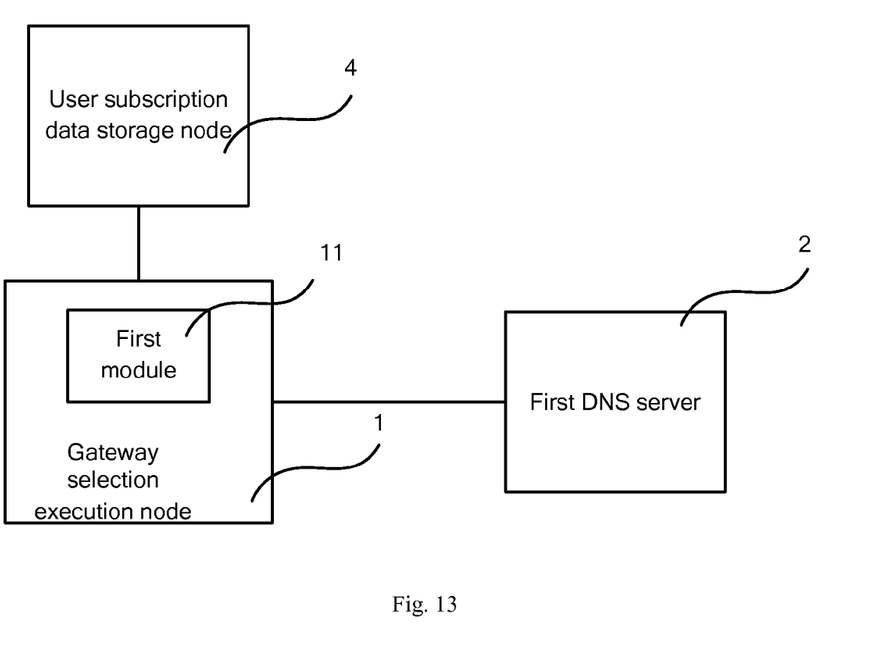
FIG. 13 is a structural schematic diagram of a system for selecting a gateway in the mobile packet domain according to a second embodiment of the invention.

A Second Embodiment of the System for Selecting a Gateway in the Mobile Packet Domain according to the Invention As illustrated in FIG. 13, the second embodiment of the system for selecting a gateway differs from the foregoing first embodiment of the system for selecting a gateway in that (only the difference from FIG. 11 is illustrated in FIG. 13) a user subscription data storage node 4 is further included, which is configured to store subscription data containing a home operator domain name feature corresponding to the user equipment, and to issue the subscription data to the gateway selection execution node.

An Embodiment of the Gateway Selection Execution Node according to the Invention The gateway selection execution node according to the present embodiment further arranges in the existing gateway selection execution node a first module, which is configured to encapsulate an operator domain name corresponding to a bearer setup request into a DNS parse request when creating the DNS parse request.

Lastly it shall be noted that the foregoing embodiments are merely intended to illustrate but not limit the technical solutions of the invention, and although the invention has been detailed with reference to the preferred embodiments thereof, those ordinarily skilled in the art shall appreciate that the technical solutions of the invention may still be modified or equivalently substituted and these modifications are not departing from the scope of the invention.

The invention claimed is:

1. A method for selecting an access gateway in the mobile packet domain, comprising:

issuing, by a user subscription data storage node, user subscription data containing a home operator domain name feature corresponding to a user equipment to the gateway selection execution node, wherein the home operator domain name feature is a domain name owned by a home operator;

appending, by a gateway selection execution node upon reception of a bearer setup request transmitted from the user equipment, the home operator domain name feature to an access point name to create an operator domain name corresponding to the bearer setup request, encapsulating the operator domain name corresponding to the bearer setup request into a Domain Name Server (DNS) parse request when creating the DNS parse request, and transmitting the DNS parse request to a DNS server;

obtaining, by the DNS server based on the operator domain name in the DNS parse request, address information of an access gateway corresponding to the operator domain name, wherein the DNS server stores operator domain names and the address information of the access gateways corresponding to respective operator domain names;

returning by the DNS server, to the gateway selection execution node, the address information of the access gateway corresponding to the operator domain name; and selecting, by the gateway selection execution node, the access gateway corresponding to the operator domain name as an access gateway corresponding to the bearer setup request according to the address information.

2. The method according to claim 1, wherein the gateway selection execution node is a roam or home gateway selection execution node for the user equipment, and the DNS server is one owned by a roam or home operator in which the operator domain name and the address information of the access gateway corresponding to the operator domain name are stored;

obtaining address information of an access gateway corresponding to the operator domain name comprises:

querying the DNS server of the roam or home operator, and searching, by the DNS server, based on the operator domain name for retrieving the address information of the access gateway corresponding to the operator domain name.

3. The method according to claim 1, wherein the gateway selection execution node is a roam gateway selection execution node for the user equipment, and the DNS server is one owned by a roam operator without storing the operator domain name and the address information of the access gateway corresponding to the operator domain name;

obtaining address information of an access gateway corresponding to the operator domain name comprises:

transmitting, by the DNS server of the roam operator, the parse request to an upper DNS server thereof, and retrieving the address information of the access gateway corresponding to the operator domain name in a standard domain name parse manner.

4. The method according to claim 1, wherein the gateway selection execution node determines whether the bearer setup request contains an access point name indicated by the user equipment before creating the DNS parse request, and if the bearer setup request transmitted from the user equipment contains an access point name indicated by the user equipment, then the gateway selection execution node uses the access point name to create the operator domain name; or if the bearer setup request transmitted from the user equipment contains no access point name indicated by the user equipment, then the gateway selection execution node uses a default access point name configured in the user subscription data to create the operator domain name.

5. The method according to claim 1, wherein the information used for the gateway selection execution node to create the operator domain name corresponding to the bearer setup request when creating the DNS parse request further comprises a country code and/or a network code, or information other than the country code and the network code in an international mobile subscriber identity.

6. The method according to claim 1, wherein the home operator domain name features correspond to the respective categories of user equipments of a home operator.

7. The method according to claim 1, wherein the gateway selection execution node determines whether the bearer setup request contains an IP address of an access gateway which the user equipment expects to use, and if the bearer setup request message transmitted from the user equipment contains the IP address of the access gateway which the user equipment expects to use, and user subscription data also allows the access gateway to be used for the user equipment, then the gateway selection execution node selects, directly according to the IP address of the access gateway contained in the bearer setup request, the access gateway corresponding to the bearer setup request.

8. The method according to claim 1, wherein if the DNS server does not obtain address information of any access gateway or a connection to the access gateway is not allowable, then the gateway selection execution node rejects the bearer setup request of the user equipment or selects a default access gateway according to a configuration policy of a roam operator as the access gateway corresponding to the bearer setup request of the user equipment or selects according to information in user subscription data an access gateway as the access gateway corresponding to the bearer setup request of the user equipment or recreates a parse request and performs again the operation of parsing for obtaining the address of the access gateway.

9. The method according to claim 8, wherein in the operation of recreating a parse request, the gateway selection execution node appends a country code and/or a network code of the user equipment contained in an international mobile subscriber identity field in the user subscription data to an access point name indicated by the user equipment to recreates a parse request.

10. A system for selecting an access gateway in the mobile packet domain, comprising a gateway selection execution node, and a first Domain Name Server (DNS) server configured to obtain address information of an access gateway according to a parse request transmitted from the gateway selection execution node, wherein the system further comprises a user subscription data storage node configured to store subscription data containing a home operator domain name feature corresponding to a user equipment and to issue the subscription data to the gateway selection execution node, the home operator domain name feature is a domain name owned by a home operator; and the gateway selection execution node further comprises a first module configured to append the home operator domain name feature to an access point name to create an operator domain name corresponding to a bearer setup request, and to encapsulate the operator domain name corresponding to the bearer setup request into the DNS parse request when creating the DNS parse request;

wherein the DNS server stores operator domain names and the address information of the access gateways corresponding to respective operator domain names.

11. The system according to claim 10, wherein the first DNS server is a DNS server of a roam or home operator and stores the operator domain name and address information of an access gateway corresponding to the operator domain name.

12. The system according to claim 10, further comprising one or more second DNS servers which are upper DNS servers of the first DNS server;

the first DNS server is a DNS server of a roam operator and does not store the operator domain name and address information of an access gateway corresponding to the operator domain name;

the first DNS server and the one or more second DNS servers are configured to perform a standard domain name parsing operation on the operator domain name in the parse request message.

* * * * *